United States Patent [19]

Matumoto

[11] 4,427,233
[45] Jan. 24, 1984

[54] SUPPORT MEANS FOR STAYS OF A CAR HEAD REST

[75] Inventor: Hiroki Matumoto, Yokohama, Japan

[73] Assignee: Ikeda Bussan Co., Ltd., Kanagawa, Japan

[21] Appl. No.: 276,951

[22] Filed: Jun. 24, 1981

[30] Foreign Application Priority Data

Jul. 10, 1980 [JP] Japan .............................. 55-97217[U]

[51] Int. Cl.$^3$ ................................................ A47C 1/02
[52] U.S. Cl. .................................... 297/391; 297/410
[58] Field of Search ...................... 297/391, 410, 397; 403/109, 112, 289

[56] References Cited

U.S. PATENT DOCUMENTS 3,865,437  2/1975  Crosby ................................. 403/289
3,948,561  4/1976  De Rosa .............................. 297/391

FOREIGN PATENT DOCUMENTS 2719858 11/1978 Fed. Rep. of Germany ...... 297/391
2200282  2/1979 Fed. Rep. of Germany ...... 297/410
591429   4/1958 Italy ................................... 403/289

Primary Examiner—James T. McCall
Attorney, Agent, or Firm—Pearne, Gordon, Sessions, McCoy, Granger & Tilberry

[57] ABSTRACT

This invention relates to a head rest for a car, and more particularly to support means for supporting stays of the head rest. The means to support stays of the head rest comprises a sleeve secured to a seat back frame and a stay guide member having a resilient jaw provided at the lower end and a flange provided at the upper end and extending through the sleeve with the jaw and the flange engaged with the lower and upper ends of the sleeve. Each of the stays of the head rest is removably inserted into the stay guide member. The stay guide member also has a stopper engaged with the sleeve. The sleeve has an axial slit extending throughout the length of the sleeve to engage the stopper of the stay guide member.

2 Claims, 3 Drawing Figures

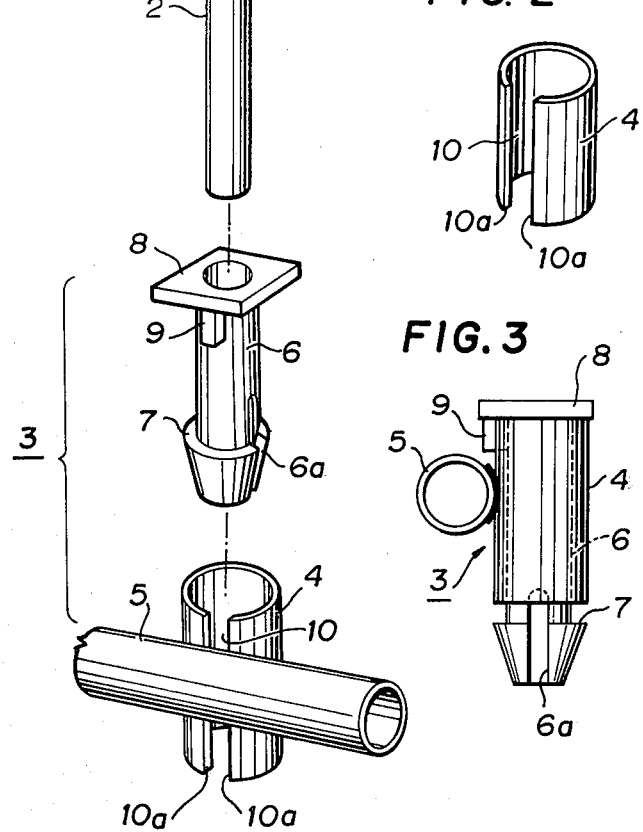

SUPPORT MEANS FOR STAYS OF A CAR HEAD REST

BACKGROUND OF THE INVENTION

Usually, a car head rest has a pair of stays which are removably inserted into respective stay guide members. Each of the stay guide members has a stopper provided on its periphery and engaged with a sleeve secured to a seat back frame, so that the stay guide member is prevented from rotation about the sleeve. In a prior art, the sleeve is formed by cutting a pipe to a predetermined length and then by providing by blanking a notch which is to be engaged by the stopper of the stay guide member. However, to prepare the sleeve with the notch formed therein, many steps are required, which causes the head rest to be expensive.

SUMMARY OF THE INVENTION

Accordingly, it is a principal object of the invention to provide support means for stays of a car head rest which can be inexpensively produced.

In accordance with the invention, there is provided support means for stays of a car head rest comprising a sleeve secured to a seat back frame; a stay guide member having a resilient jaw provided at its lower end and a flange provided at its upper end and extending through said sleeve with said jaw and said flange engaged with the lower and upper ends of said sleeve, each of said stays of said car head rest being removably inserted into said stay guide member, said stay guide member having a stopper engaged with said sleeve so that said stay guide member is prevented from rotation about said sleeve, characterized in that said sleeve has an axial slit extending throughout the length of said sleeve, and said stopper of said stay guide member engaging said axial slit in said sleeve.

BRIEF DESCRIPTION OF THE DRAWING

The above and other objects and features of the invention will be apparent from the description of the embodiment of the invention taken along with reference to the accompanying drawing in which:

FIG. 1 is an exploded perspective view of a car head rest removably supported by support means of the invention;

FIG. 2 is a perspective view of a sleeve used for the support means of FIG. 1; and FIG. 3 is a side elevational view of the support means of the invention.

DETAILED DESCRIPTION OF THE EMBODIMENT

FIG. 1 shows a car head rest 1 having a pair of stays 2, only one of which is shown to be supported by support means 3 of the invention.

The support means 3 of the invention comprises a sleeve 4 which is secured to a seat back frame 5 of metal tube and a stay guide member 6 which is supported in the sleeve 4.

The stay guide member 6 has a resilient jaw 7 provided at its lower end and a flange 8 provided at its upper end. The stay guide member 6 may be frustoconical and may have an axial slit 6a provided at its lower portions so that the jaw 7 can be radially contracted when the stay guide member 6 is inserted into the sleeve 4. Thus, it will be noted that the stay guide member 6 can be smoothly inserted into the sleeve 4, and that the jaw 7 and the flange 8 can be engaged with the lower and upper ends of the sleeve 4 when the stay guide member 6 is fully inserted into the sleeve 4 as shown in FIG. 3. This causes the stay guide member 6 to be supported on the sleeve 4 without being removed out of the sleeve 4 upon removal of the stay 2. The stay guide member 6 has also a stopper 9 provided at its upper end. The stopper 9 is engaged with the sleeve 4 as described in detail later.

The sleeve 4 has an axial slit 10 extending throughout the length of the sleeve. Thus, it will be noted that the sleeve 4 may be produced by cylindrically deforming a metal strip with an axial slit formed between the faced edges of the metal strip (FIG. 2). It should be understood that this decreases the steps of preparing the sleeve and the support means can be inexpensively provided. As shown in FIG. 1, the edges 10a of the slit 10 in the sleeve 4 may be welded to the seat back frame 5. The slit 10 has the same width as the stopper 9 of the stay guide member 6 has. When the stay guide member 6 is inserted into the sleeve 4, the stopper 9 of the stay guide member 6 is also inserted into the slit 10 in the sleeve 4. Thus, it will be noted that the stay guide member 6 is prevented from rotation about the sleeve 4 by engagement of the stopper 9 of the stay guide member 6 with the slit 10 in the sleeve 4.

While one preferred embodiment of the invention is illustrated and described with reference to the accompanying drawing, it will be understood that it is by way of example, and that various changes and modifications may be made without departing from the spirit and scope of the invention, which is intended to be defined only by the appended claims.

What is claimed is:

1. Support means for stays of a car head rest comprising a sleeve secured to a seat back frame; a stay guide member having a resilient jaw provided at its lower end and a flange provided at its upper end and extending through said sleeve with said jaw and said flange engageable with the lower and upper ends of said sleeve respectively, each of said stays of said car head rest being removably inserted into said stay guide member, said stay guide member having a stopper engaged with said sleeve so that said stay guide member is prevented from rotation about said sleeve, characterized in that said sleeve has an axial slit extending throughout the length of said sleeve, and said stopper of said stay guide member engaging said axial slit in said sleeve.

2. Support means for stays of a car head rest as set forth in claim 1, wherein said sleeve is formed by cylindrically deforming a metal strip with an axial slit formed between the faced edges of said metal strip.

* * * * *